United States Patent [19]
Weisbecker

[11] 4,270,125
[45] May 26, 1981

[54] DISPLAY SYSTEM

[75] Inventor: Joseph A. Weisbecker, Cherry Hill, N.J.

[73] Assignee: RCA Corporation, New York, N.Y.

[21] Appl. No.: 722,584

[22] Filed: Sep. 13, 1976

[51] Int. Cl.[3] .............................................. G06F 3/153
[52] U.S. Cl. ..................................... 340/744; 340/798; 340/814; 358/903
[58] Field of Search ................ 340/324 AD, 744, 798; 358/13, 141; 315/367, 383, 384, 385, 386

[56] References Cited

U.S. PATENT DOCUMENTS

| | | | |
|---|---|---|---|
| 2,920,312 | 1/1960 | Gordon et al. | 340/746 |
| 3,345,458 | 10/1967 | Cole et al. | 340/750 |
| 4,012,592 | 3/1977 | Ricard | 340/749 X |

*Primary Examiner*—David L. Trafton
*Attorney, Agent, or Firm*—Samuel Cohen; Carl V. Olson

[57] ABSTRACT

System for displaying computer generated information on a display screen such as a standard television raster by mapping memory bits onto corresponding points of the raster. The information is applied serially to the television circuits in synchronization with the sweep rate of the television. Horizontal and vertical synchronization signals are also generated to control the receiver sweep circuits.

2 Claims, 4 Drawing Figures

DISPLAY SYSTEM

This invention relates to the display of binary data on raster scan display devices such as television receivers.

In order to be useful, computer data must be displayed in a way that can be perceived by persons. Numerical display devices are low in cost but limited in scope. Printers, including typewriters and teletypewriters, are more versatile and are also more expensive. CRT vector displays offer a wide range of presentations, including graphs and pictures, but are very expensive.

As the cost of processors decreases, i.e., as in the case of microprocessors, it becomes more desirable to utilize low cost display devices. One such device is the ubiquitous standard television receiver (STR). A major problem of using an STR is synchronizing the desired display with the raster scan.

One solution to the problem has been to generate ramp voltages at horizontal and vertical deflection rates. The ramps in some cases can be taken from the sweep circuits of the STR and, by use of suitable amplifiers, scaled to any convenient amplitude. Using comparators, a reference voltage can be compared with each ramp to generate output signals when the ramp voltages are equal to the reference voltages. The horizontal ramp comparator output signal defines a vertical line on the raster and the vertical comparator output signal defines a horizontal line. By ANDing the two comparator output signals, a pulse can be produced corresponding to any point on the raster selected by appropriate reference voltages. The reference voltages may be made variable corresponding to the desired display. Such a system, however, is expensive and complex.

Another solution has been to use variable delays to generate pulses referenced to the beginning of the horizontal and vertical traces so that their concurrence defines a spot on the raster. This solution has several disadvantages in terms of complexity and cost.

Other solutions include the utilization of video signals generated by commercially available integrated circuits. (See, for example, National Semi-Conductor MM4320/MM5320 or Fairchild 3262). These circuits generate composite synchronization signals and appropriate timing signals. Some also generate a color burst. Their use requires additional complex control logic and video output circuits.

A system embodying the invention comprises a relatively simple circuit which may be constructed from standard logic elements such as these commercially available in integrated circuit form, to generate all the signals required to map the memory area in which the display information is stored onto the raster of a display device. The system includes a memory associated with a computer. The computer has facilities for direct memory access to read memory data from a location specified by a pointer register onto a data bus. An interval timer responsive to timing signals generated by a clock produces horizontal synchronizing signals, which are coupled to the display device. A line counter, incremented by the horizontal synchronizing signals, produces sequential binary values identifying particular horizontal lines. Decoders responsive to the binary values produce a direct memory access request to the computer and vertical synchronizing signals to the display device. The data on the data bus as a result of the direct memory access request is stored and shifted serially to the video circuits of the display device.

Figure 1:
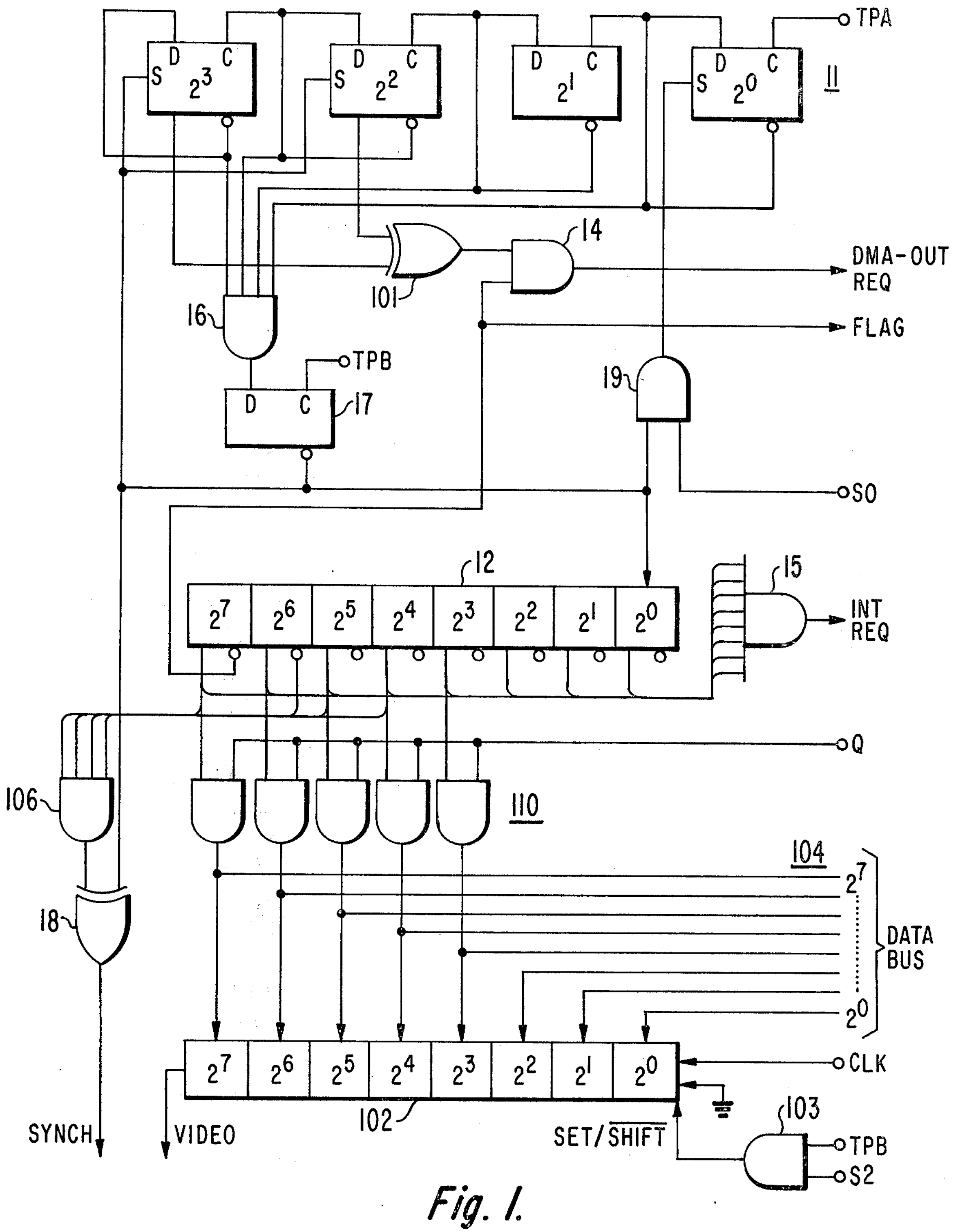
FIG. 1 is a logic diagram of a preferred embodiment of the invention.

The preferred embodiment is explained and illustrated as it would be used with a COSMAC-type microprocessor, CDP 1802 (RCA Corporation). The detailed operations and instructions of a CDP 1802 COSMAC microprocessor are explained in detail in data sheets available from the manufacturer. The invention can be used with other microprocessors by one of ordinary skill in the art according to the teachings of the invention.

The video display is accomplished by mapping the memory bits devoted to the display onto a standard television raster. Each memory bit has a logical value of one or zero. Therefore, each bit can represent a light or dark spot at a particular location on the raster, depending on the bit's value. Alternatively, a group of bits can be used to represent a gray scale code. For example, each pair of bits can represent one of four brightness levels at a particular point on the raster. Such a gray scale requires digital-to-analog conversion and twice the data transfer speed. More levels per raster point can be displayed, but a correspondingly higher data transfer is required. For n levels, $$k = \text{int} \geqq [\log_2 n]$$

where k is the data rate increase factor.

To make the system as economical as possible, the simplest display form—each bit representing a point on the raster—will be implemented, although it is within the ordinary skill of the art to modify the described system to produce gray levels.

Each lighted spot on the raster can be displayed in one of several formats. One format is simply to illuminate each spot on a given sweep line with a corresponding bit. Other formats are the use of each bit to illuminate spots at the same horizontal position on two or more successive sweep lines. The bandwidth of standard television receivers limits the fineness of the dot that can be produced. The spot actually displayed is a pulse having a width equal to the period of the clock. For a clock frequency of 1.720320 MHz., each displayed pulse has a duration of about 580 nanoseconds. If the amplifiers of the associated television receiver have a full 6 MHz. bandwidth, then the maximum rise time of the pulse will be approximately 58 nanoseconds. Therefore, the pulse shape displayed is essentially trapezoidal with the first and last ten percent of the pulse used in rise and fall times. Adjacent dots of the same value will form continuous lines because the trailing edge of one pulse will merge into the leading edge of the next. Since the raster line is 58 microseconds long, each spot occupies about one percent of the swept line. If the horizontal lines are one foot long, the dot will have length of about an eighth of an inch. Therefore, repeating information on successive lines results in a more symmetrical spot and the display has less smear. The preferred embodiment uses one, two, or four raster lines for each information line.

An information line in the preferred embodiment is comprised of sixty-four dot positions. There are 128 sweep lines of display in the preferred embodiment. If one information line is repeated on four successive sweep lines, then the memory is mapped onto a 32×64 matrix of dots, requiring 2048 bits or 256 eight-bit bytes of memory. Repeating each information line on two successive raster lines maps the memory onto a 64×64 matrix of dots, requiring 4096 bits or 512 bytes. One information line for each raster line results in a 128×64 matrix, requiring 1024 bytes of memory for display. Unless otherwise noted, the description herein applies to the 32×64 matrix. The number of sweep lines per information lines can vary down to a one line limit requiring only eight bytes of memory but displaying only a vertical striped pattern.

The clock in the preferred embodiment operates at a frequency of 1.720320 MHz. The horizontal interval counter 11 (FIG. 1) usually counts fourteen occurrences of the timing pulse TPA, which pulse is generated once per machine cycle. Because each machine cycle requires eight clock pulses, fourteen TPA's require about 65.1 microseconds. A field, or vertical interval, requires 256 horizontal intervals, and, therefore, has a duration of about 16.666 milliseconds. This results in sixty fields (thirty frames) per second. Although the resulting vertical rate is almost exactly equal to the standard vertical rate, the horizontal interval varies somewhat from the standard of approximately 63.5 microseconds. There are some horizontal intervals requiring only thirteen TPA periods because of a synchronization problem which is explained in more detail below. These intervals require 60.45 microseconds. Therefore, most horizontal intervals are about two microseconds longer than the usual 63.5 microseconds and a few are about three microseconds shorter. Since the receiver's horizontal sweep circuit is controlled by an average of synchronization pulses, it can tolerate small variations in the synchronization interval. Any horizontal pertubations which might result can be eliminated by adjusting the receiver's horizontal hold control.

The 256 lines per field are chosen to simplify the line counter 12, shown in FIG. 1 as an eight-stage ripple counter. A ninth stage could be added and, with appropriate feedback, count 262 horizontal intervals per field. The clock frequency in such a case would be changed to 1.7606640 MHz. The horizontal interval then becomes 63.6 microseconds and the vertical rate, 60 fields per second. The use of 262 lines per field corresponds more closely to the standard television signal of 262.5 lines per field.

With the clock synchronized to the required digital rate of the associated television set and with the word (byte) read-out time to the television equal to one machine cycle as shown in the preferred embodiment, the processor time during display periods is necessarily devoted solely to display. Depending on the format of the display as explained above, an increase in processor time not devoted to display can be gained by providing more video storage in the display system. That is, if an information line is to be repeated, all the bits of a line can be stored in a circulating shift register. This increases the cost, however.

By using only sixty-four columns, or dot positions, per line, and only 128 raster lines, processor time is available at the beginning and end of each line to perform several instructions, and at the end of each field to modify the display area in the memory. Changing the display area in the memory while it is being displayed can cause annoying flicker. The processor time at the end of each line can be used to modify the direct memory access pointer as explained below. The processor time between the end of the 128th line and the beginning of the 255th line can be used to execute general programs, including the update of the display information before the next display period.

Figure 2:
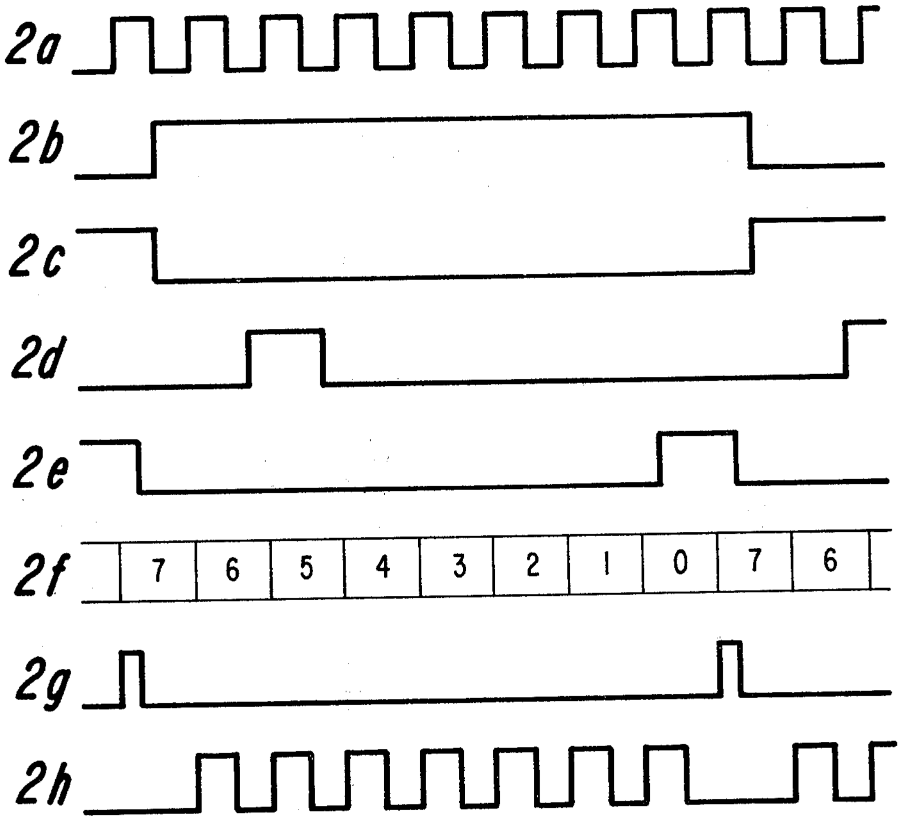
FIG. 2 is a timing diagram showing the relationship of certain signals (2*a* through 2*h*) used in the circuit of the invention.

The timing diagram shown in FIG. 2 for a COSMAC implementation will be explained to assist in understanding the invention. FIG. 2(*a*) represents the clock signal. FIG. 2(*b*) is, typically, a machine cycle which begins at the negative-going edge of the clock and lasts for eight cycles thereof. An S0 cycle is the instruction fetch cycle of the processor and an S1 cycle is the instruction execution cycle. The relationship between S0 and S1, the latter as shown in FIG. 2(*c*), is such that they alternate during normal operation times except for certain instructions which require two S1 cycles in succession for execution. FIG. 2(*d*) shows the relationship of a timing pulse, TPA, to a typical machine cycle represented by FIG. 2(*b*). The TPA signal indicates that the first eight bits of the memory address signals are valid and can be latched; the second group of multiplexed address signals follows TPA. FIG. 2(*e*) represents the TPB signal which is produced when the information on the data bus, whether from the processor or from the memory, is valid. FIG. 2(*f*) represents the relative times that the video bits are displayed in response to the clock and cycle signals. The signal represented in FIG. 2(*g*) sets the video register (102 in FIG. 1) to the byte on the data bus at the appropriate TPB signal time. The signals in FIG. 2(*h*) represent the shift signals that shift the data in the video register to the next higher order stage. The signal shown in FIG. 2(*g*), the video set signal, occurs only during a direct memory access cycle S2 when the memory data addressed by the direct memory access pointer is on the data bus.

The operation of the circuit of FIG. 1 is best explained by noting that from line 128 through line 255, the processor is executing sequential instructions of a program. The line counter 12 is an eight-stage ripple counter, well known in the art. The $2^7$ stage of the line counter 12 is set during lines 128 through 255 and disables an AND gate 14 by the reset output signal from that stage. At line 255, all the stages of the line counter 12 are set, and this condition is detected by an eight-input AND gate 15 which produces an interrupt request (INT REQ) signal to the processor.

The line counter 12 is triggered by the set output signal from a horizontal synchronization flip-flop 17. The flip-flop 17 is set by the zero output signals from a horizontal interval counter 11 that is decremented by the TPA signal during each cycle of the processor. When each stage in the horizontal interval counter 11 is storing a zero, an AND gate 16 is enabled and the following TPB signal sets the flip-flop 17. The set output signal from the flip-flop 17 sets a predetermined value into the horizontal interval counter 11 as described below in more detail. It also provides a horizontal synchronization signal to an Exclusive OR gate 18. The output signal from the Exclusive OR gate 18 is the composite synchronization signal for controlling the sweep circuits of the television receiver.

In normal operation, the TPB signal that sets the flip-flop 17 occurs during an S0 machine cycle. The set output signal from the flip-flop 17 thereupon jams the value of thirteen (binary 1101) into the counter 11—that is, a logical one is set into the $2^0$, $2^2$, and $2^3$ stages of counter 11—which then requires fourteen machine cycles to decrement through a value of zero. If, however, the flip-flop 17 is set by the TPB signal of an S1 machine cycle, then an AND gate 19 is disabled so that the least significant stage of the counter is not set, causing a value of twelve (binary 1100) to be jammed into the interval counter 11. The selective setting of the $2^0$ bit of the counter 11 maintains the synchronization between the display system and the processor.

During the machine cycles which correspond to values of eleven down to four in the interval counter 11, an Exclusive OR gate 101 is activated which primes the AND gate 14. The output signal from the AND gate 14 is the DMA (Direct Memory Access) OUT request signal to the processor and is enabled only during lines 0 through 127 by the reset output signal from the $2^7$ stage of the line counter 12.

Figure 3:
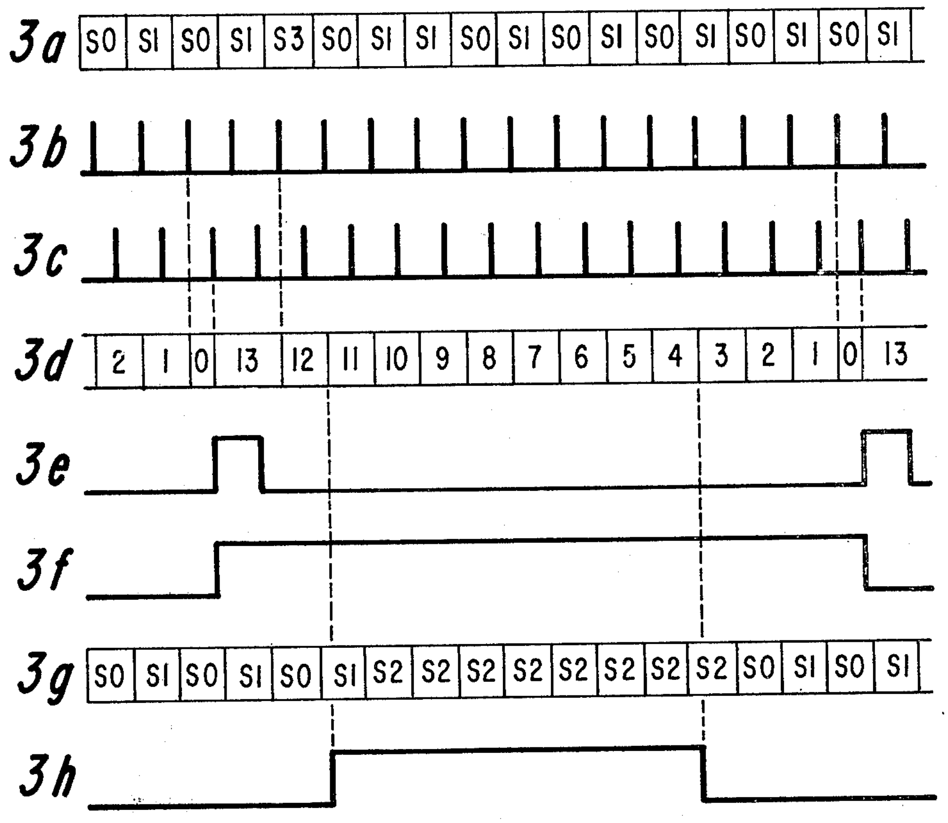
FIG. 3 is a timing diagram showing the relationship of certain signals (3*a* through 3*h*) in the circuit of the preferred embodiment.

The signals described in the system of FIG. 1 are shown in the timing diagrams of FIG. 3. FIGS. 3(*b*) and 3(*c*) represent the TPA and TPB signals of each machine cycle, respectively. FIG. 3(*d*) shows the value in the interval counter 11 corresponding to various points in one raster line. FIG. 3(*a*) shows a typical cycle sequence for the machine during raster line 255. The first S0 and S1 cycles in FIG. 3(*a*) correspond to the last two cycles during line 254. The signal shown in FIG. 3(*f*) represents the output signal from the AND gate 15, the interrupt request, that corresponds in time to line 255. An interrupt signal occurring during an S0 cycle does not inhibit a following S1 cycle, after which an S3 (interrupt) cycle occurs.

The set output signal from the flip-flop 17 (FIG. 1) is shown in FIG. 3(*e*). When the number stored in the horizontal interval counter 11 is zero, the TPB signal sets the flip-flop 17, generating a horizontal synchronization signal and jamming a value of thirteen into the counter 11. When the value of thirteen is set into the counter 11, the set stages disable the AND gate 16 so that the next TPB pulse resets the flip-flop 17. Each time the flip-flop 17 is set, the line counter 12 is incremented by one. The cycles of line 0 are similar to those of lines 1 through 127 and are shown in FIG. 3(*g*). The first two machine cycles shown are those from the preceding line. As shown in FIG. 3(*h*) the DMA-out request is generated when the value of the interval counter is decremented to eleven as shown in FIG. 3(*d*). The DMA request signal is held high for eight cycles, i.e., until the counter value is less than four. This causes eight DMA cycles (S2) to be generated in succession. During an S2 cycle, data is clocked into the video register 102 in FIG. 1 from the data bus 104 by the output signal from an AND gate 103.

The video register 102 (FIG. 1) is an eight bit parallel-to-serial converter such as an integrated circuit device CD4021 (RCA Corporation). The set/$\overline{\text{shift}}$ output signal from the AND gate 103 corresponds to the parallel/$\overline{\text{serial}}$ control signal of the CD4021. When the set/$\overline{\text{shift}}$ signal is high, a clock signal gates the data from the data bus 104 into corresponding stages of the video register 102. When the set/$\overline{\text{shift}}$ signal is low, the clock signals shift the data in the video register 102 to the next higher order stage. The AND gate 103 is enabled during a DMA S2 machine cycle by a TPB signal. The timing is shown in FIG. 2; the output signal from AND gate 103 is shown in FIG. 2(*g*) and the shift signals are shown in FIG. 2(*h*). The serial output signal from the video register is from the $2^7$ stage and is the video output signal. Logical zeroes are gated into the register 102 behind the data so that there will be no video values of one gated out during the non-display interval. This eliminates the need for gating the clock signal. That is, the video register 102 is being continually shifted by the clock signal and supplying video information. Alternatively, the clock signal to the video register 102 can be gated by the reset output signal from the $2^7$ stage of the line counter 12 to prevent shifting during the non-display interval.

An AND gate 106 decodes line count values of 176 through 191 to generate a vertical synchronization signal, which is coupled to the Exclusive OR gate 18. The AND gate 106 is responsive to the set output signals from the $2^7$, $2^5$, and $2^4$ stages and to the reset output signal from the $2^6$ stage of the line counter 12. During a vertical synchronization pulse, the horizontal synchronization pulses applied to the Exclusive OR gate 18 cause the serration pulses in the vertical synchronization signal that maintain the horizontal oscillator of the associated television set in synchronization during the vertical blanking interval.

The reset output signal from the $2^7$ stage of the line counter 12 furnishes a flag signal to the processor which can be sensed to determine whether the display interval is finished. That is, during lines 0 through 127, the flag signal to the processor indicates that the data is being displayed from the memory. At line 128, when the $2^7$ stage is set, the absence of the flag can be sensed by the processor to indicate that the data in the memory can be changed.

The Direct Memory Access logic of the COSMAC microprocessor requires only external request signals to initiate DMA-OUT or DMA-IN operations. A special machine cycle S2, identified externally by state code output signals, controls the DMA function in the processor. When a request signal (including an interrupt request) is received, the instruction being performed or fetched is completed. That is, if a request occurs during cycles S0 or S1, the S1 execution cycle—the second S1 in three-cycle instructions—will be completed. The R0 register in the register stack of the COSMAC processor is used as the DMA pointer. During a DMA cycle, the contents of R0 are gated to the memory address bus and, in the case of a DMA-OUT request, a read command is sent to the memory. The R0 register is thereupon incremented so that it points to the location of the next word (byte) to be read out. The data at the addressed location is valid on the data bus at the occurrence of TPB.

In the preferred embodiment, the DMA-OUT request signal from the AND gate 14 initiates eight sequential DMA cycles that retrieve from eight successive locations in the memory eight bytes of information that are displayed on a TV raster line. If one information line per raster line is to be displayed, the value of the R0 register need not be adjusted until the end of each frame. That is, R0 is simply incremented automatically through all the display locations. If an information line is to be displayed on two successive lines, then at the end of each first line of a pair of lines, the value of R0 must be restored to its value to specify the beginning of the line. If each information line is to be displayed on four successive raster lines, then the value of R0 must be restored after each of the first three raster lines of each group of four. The adjustment of the R0 register is performed after each line by appropriate instructions.

A useful hardware addition for implementing a two raster lines per information line format comprises a group of AND gates 110 in FIG. 1. At the end of each line, a Q signal, generated by a special instruction, gates the five high order bits of the line counter 12 onto the data bus. The processor can store the data in the lower half (least significant byte) of the R0 register. The value gated from the AND gates 110 is the same for each two successive lines because the values in the lower three stages are zero. The count from −000 to −111 does not change the value of the $2^3$ stage.

Figure 4:
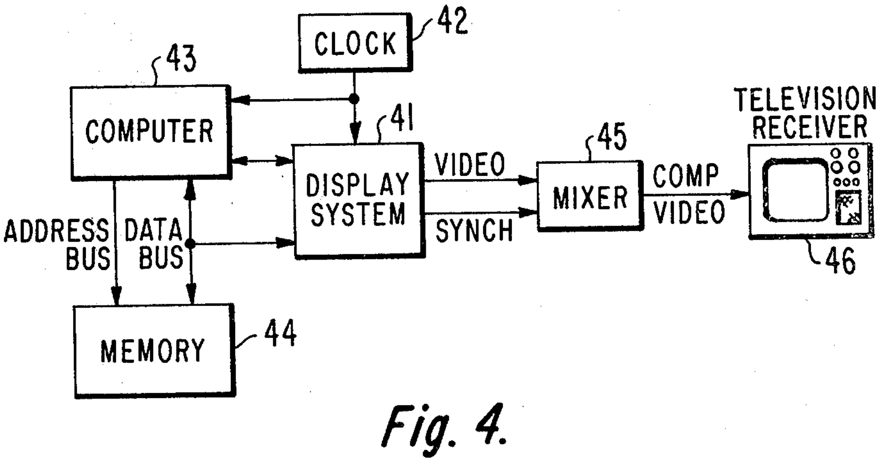
FIG. 4 is a block diagram of a system in which the invention is used.

FIG. 4 is an illustration of a typical use of the apparatus described above. The display system 41 of the invention receives timing signals from a clock 42, control signals from a computer 43, and data from a memory 44. The display system 41 provides signals to the computer 43 and to a mixer 45. The output signal from the mixer 45 is composite video which is coupled to a standard television receiver 46; the composite video signal can be coupled directly to the receiver's video circuits ahead of the synchronization separator take-off, or used to modulate a carrier that is coupled to the antennae terminals of the receiver.

The preferred embodiment is explained above as used with a COSMAC microprocessor. Using the teachings of this disclosure, however, the display system can be adapted to other microprocessors or computers by those of ordinary skill in the art. Some microprocessors are not provided with DMA capabilities, but logic can be added to most of them to provide interrupt and DMA features. (See, for example, "Increase Microcomputer Efficiency," D. C. Wyland, *Electronic Design* 23, Nov. 8, 1975, pp. 70–75, or "Speed Microprocessor Responses," E. Fisher, IBID, pp. 78–83.) Timing pulses like TPA and TPB can be decoded from the clock if the associated processor does not generate them.

Although explained in connection with a standard television receiver, other modifications are possible. The system, as described and claimed can be used in other raster scanned display devices such as LED and LCD matrices, CCD devices, and so on. The modifications required for each particular device are within the ordinary skill of the art in light of the disclosed invention.

What is claimed is:

1. A system for displaying a pattern on a raster scanned display device by mapping bits from a display location in a memory associated with a computer onto the raster as contrasting spots depending on the value of each bit, wherein said computer is responsive to a direct memory access request to produce on a data bus, data signals retrieved from said memory at a location specified by a pointer address register, comprising the combination of:

clock means for producing timing signals;

output means for coupling signals to said display device;

means, including interval timing means, responsive to said timing signals, for producing horizontal synchronizing signals and applying them to said output means;

line counter means responsive to said horizontal synchronizing signals for producing output signals identifying individual horizontal lines;

first decoder means responsive to said interval timing means and to said line counter means for supplying direct memory access requests to said computer;

second decoder means responsive to said line counter means for supplying vertical synchronization signals to said output means;

means for storing data signals from said data bus in response to a signal derived from said timing signals when said computer responds to a direct memory access request and for shifting said data serially to said output means in response to said timing signals; and a plurality of gating means, responsive to a command signal, for coupling the output signals from the line counter means to the data bus means.

2. A system for displaying a pattern on a raster scanned display device by mapping bits from a display location in a memory associated with a computer onto the raster as contrasting spots depending on the value of each bit, wherein said computer is responsive to a direct memory access request to produce on a data bus, data signals retrieved from said memory at a location specified by a pointer address register, comprising the combination of:

clock means for producing timing signals;

output means for coupling signals to said display device;

means, including interval timing means, responsive to said timing signals, for producing horizontal synchronizing signals and applying them to said output means;

line counter means responsive to said horizontal synchronizing signals for producing output signals identifying individual horizontal lines;

first decoder means responsive to said interval timing means and to said line counter means for supplying direct memory access requests to said computer;

second decoder means responsive to said line counter means for supplying vertical synchronization signals to said output means; and means for storing data signals from said data bus in response to a signal derived from said timing signals when said computer responds to a direct memory access request and for shifting said data serially to said output means in response to said timing signals;

said output means including an Exclusive-OR gate receptive of said vertical and horizontal synchronizing signals for producing a composite synchronizing signal having horizontal serrations in said vertical synchronization signal.

* * * * *